July 11, 1961 E. T. G. LIND 2,991,902
SEALING DEVICES
Filed Nov. 19, 1957 2 Sheets-Sheet 1
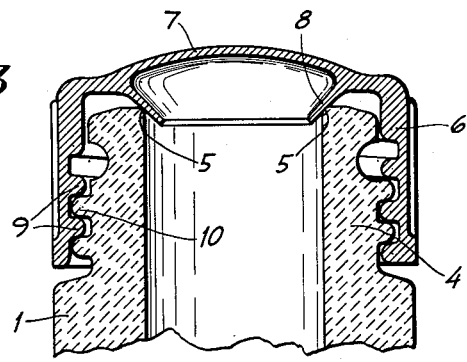
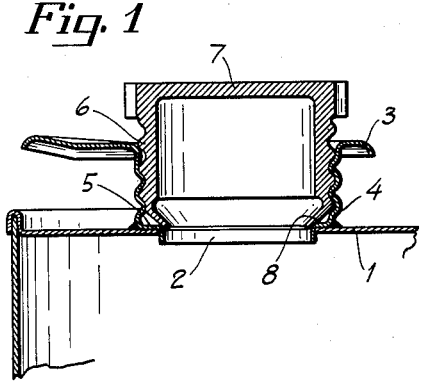
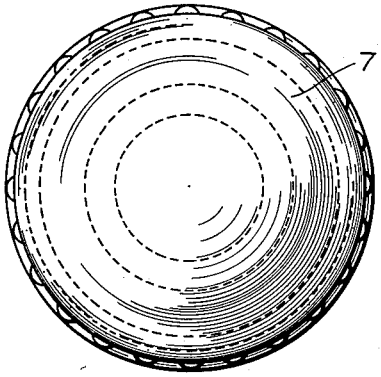
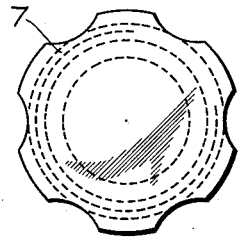
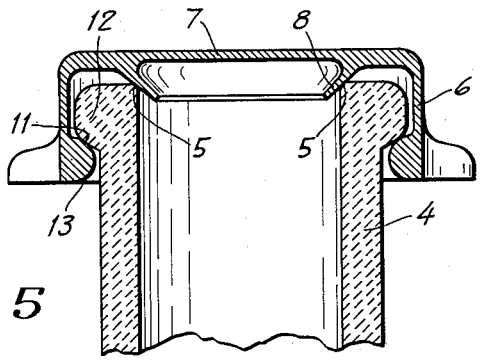
INVENTOR
EVALD TORBJÖRN GUSTAV LIND
By Linton and Linton
ATTORNEYS INVENTOR
EVALD TORBJÖRN GUSTAV LIND
By Linton and Linton
ATTORNEYS

2,991,902
SEALING DEVICES
Evald Torbjörn Gustav Lind, Hamnbassangen, Trollhattan, Sweden
Filed Nov. 19, 1957, Ser. No. 697,491
Claims priority, application Sweden Nov. 27, 1956
1 Claim. (Cl. 220—39)

The present invention relates to a sealing device between two members and more particularly to a sealing device between the opening of a receptacle or container and a closing device or member for said opening. The invention has for its principal object to provide a sealing device for this purpose which is simple in construction, cheap in manufacture and efficient in operation. Other objects of the invention will be made clear by the following description with reference to the accompanying drawings illustrating some embodiments of the invention.

Figure 6:
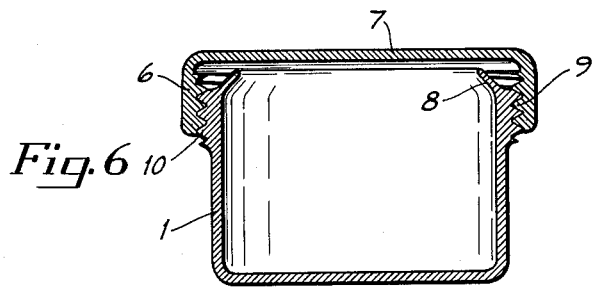
Figure 10:
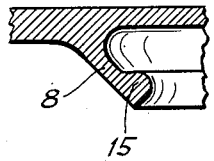
Figure 7:
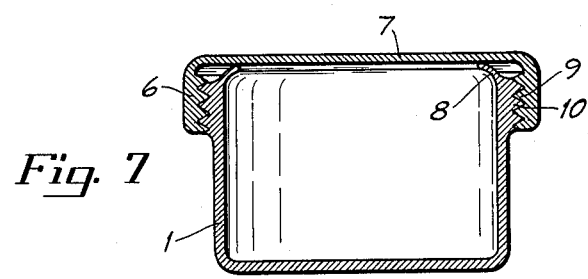
Figure 11:
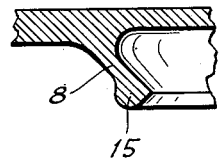
Figure 8:
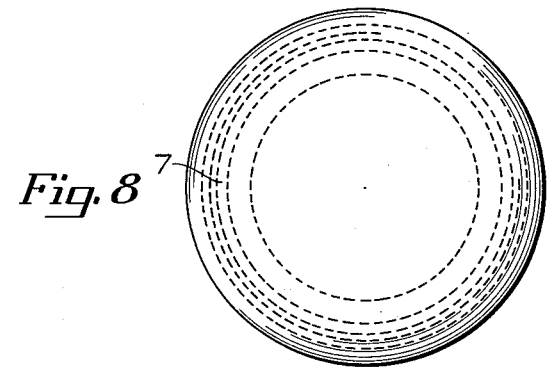
Figure 12:
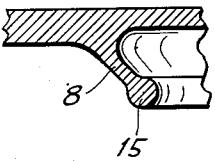
Figure 9:
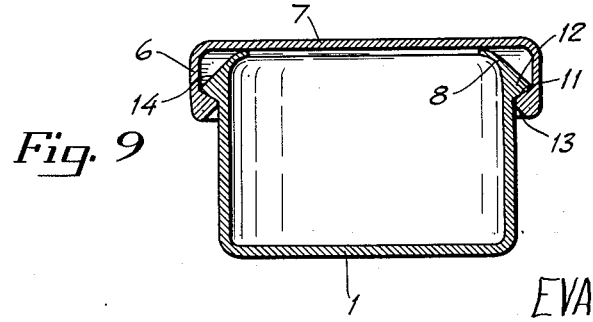

In the drawings, FIG. 1 is a vertical section of the top portion of a container the opening of which is closed by a screw plug with a sealing device according to the invention. FIG. 2 is a top plan view of the screw plug. FIG. 3 is a vertical section of a bottle neck having a screw cap according to a second embodiment of the invention. FIG. 4 is a top plan view of this second embodiment. FIG. 5 is a vertical section corresponding to FIG. 3 and illustrating a third embodiment. FIGS. 6 and 7 are vertical sections of a fourth embodiment with the closing device in different positions. FIG. 8 is a top plan view of this fourth embodiment. FIG. 9 is a vertical section of a container with closing device of another construction and having a sealing flange similar to that of FIGS. 6 to 8. FIGS. 10 to 12 are sections showing various forms of the sealing flange.

In FIGS. 1 and 2, in which the closing device is constituted by a screw plug, 1 denotes the top portion of the container about the opening 2 of which a neck or collar 3 with an internal screw thread 4 is secured to the container, said neck or collar having a step 5 forming a seat for the screw plug. This plug comprises a cylindrical sleeve portion 6 having an external thread and formed integrally with a disc-shaped cover and handle portion 7 whereas the lower end of the sleeve portion is formed with an annular sealing flange 8 having conical inner and outer surfaces. The free edge of this frusto-conical sealing flange is directed inwards towards the axis line of the cylindrical sleeve portion 6. The conical inside of the sealing flange forms an obtuse angle to the inside of the sleeve portion 6. The sealing flange is substantially thinner than the sleeve portion 6, and the material is of such a nature that the sealing flange, which is cast integrally with the screw plug, is elastically deformable in a substantially higher degree than the sleeve portion 6 which is comparatively rigid. Suitable properties for this purpose have certain plastics materials such as polythene.

When the screw plug is screwed home, the conical outside of the elastic sealing flange 8 will resiliently abut against the seat 5. By the elasticity of the flange an efficient seal is obtained, and, when the screw plug is well tightened, it is not exposed to be easily released by vibrations.

FIGS. 3 and 4 show the invention applied to a screw cap for a bottle or the like. This screw cap has a cover portion 7 and a sleeve portion 6 designed to encircle the neck 4 of a bottle 1 or other container and provided with engaging means consisting of an internal screw thread 9 engaging with an external screw thread 10 on the neck. The underside of the cover portion 7 is formed with an annular flange 8 of elastic character and of a frusto-conical shape tapering downwardly. The thickness of this flange preferably decreases towards the free end thereof. The conical inside of this flange forms an acute angle with the underside of the cover portion 7, and the conical outer side of the flange is designed to abut against the mouth of the neck at 5. When the screw cap is screwed home, the outer side of the resilient sealing flange 8 is forced against the seat 5 whereby a tight closing is obtained. The closing head may be made from plastics material, for example of the kind above mentioned, at least the lower and inner portion of the sealing flange (except the edge bead which may be provided as shown in FIGS. 10 to 12) being thinner than the cover portion 7 so that the latter and the sleeve portion 6 are relatively rigid as compared with the sealing flange 8.

The embodiment of FIG. 5 agrees with the embodiment just described with the exception of the means by which the cap is connected with the neck 4. According to the embodiment of FIG. 5, the sleeve portion 6 is somewhat elastic and is stepped at its lower edge as shown at 11, this stepped portion co-operating with the underneath side of an external bead 12 or the like on the neck 4. The lower end surface 13 of the sleeve portion 6 is substantially conical so that the closing cap by making use of the elasticity of the sleeve portion may be forced over the mouth of the neck in which operation the lower end of the sleeve portion will be distended by the co-operation of the end surface 13 with the bead 12 of the bottle. Thus, in this operation the closing cap is connected with the bottle without rotation of same, and also in this case the flange 8 in closed position is elastically deformed by its pressure against the seat 5.

According to FIGS. 6 to 9 the upper edge portion of the container 1 consists of a sealing flange 8 having the shape of a hollow frustum of a cone tapering upwards. This flange is thinner than the adjacent side wall portion of the container, and the container is made from such a material that its thicker sections are relatively rigid and its thinner sections are relatively elastic. By preference, the container is made from suitable plastics material (such as polythene or polyamide plastic). In the embodiment of FIGS. 6 to 8, the outer side of the container 1 is provided with a screw thread 10 adapted to engage with an interior screw thread 9 on the sleeve portion 6 of the closing cap. This cap may be made from hard or semi-hard material (sheet metal, rigid or semi-rigid plastics material etc.). When the closing cap is screwed home on the container, the underside of its cover portion 7 will elastically deform the flange 8 which will be bent down and inwards as shown by FIG. 7, and the flange by an elastic pressure will tightly abut against the cover portion 7. By this arrangement the opening of the container will be sealed very well.

In the embodiment of FIG. 9, the container has a sealing flange 8 similar to that one described with reference to FIGS. 6 to 8, but in FIG. 9 the means, by which the cap is held in closing position, comprise an external bead 12 on the container, said bead in the closed position of the cap co-operating with an inwardly projecting flange 11 on the sleeve portion 6 of the cap. The lower surface 13 of the sleeve portion 6 is substantially conically shaped so that the cap can be forced over the opening of the container in which operation the lower edge of the cap owing to the elasticity thereof is widened by the co-operation of the conical surface 13 with the conical surface 14 forming the upper side of the bead 12. The cap is made from semi-rigid or pliable material enabling a certain elastic deformation of the cap, when it is forced over or removed from the container after which the cap recovers its normal shape. Also in this case the container and the cap may be made from suitable plastics material.

The conical inside of the sealing flange 8 in the embodiments of FIGS. 6–9 forms a direct continuation of the inside of the adjacent portion of the side wall of the container. Upon removal of the cap, the free edge of the flange may serve as a sweeping edge by means of which material sticking to the fingers, a brush or other object may be brought back to the container.

When made from certain materials, the sealing flange 8 of the various embodiments requires a reinforcement in order to prevent the formation of wrinkles or cracks in the thin flange, deteriorating the sealing effect. For this purpose the free edge of the flange is formed with a bead 15 all around the flange, which bead may have various cross-sections as shown by FIGS. 10 to 12.

In each embodiment the cone angle of the frusto-conical sealing flange 8 may be about 30 to about 120 degrees.

What I claim is:

A sealing device for a container having an interiorly threaded tubular neck above an opening to be closed and a seat for said device surrounding said opening, said sealing device comprising, in combination, a closing member having a plug portion with an external thread on said plug portion adapted to threadedly engage with the interior thread of the neck, a handle portion on one end of said plug portion and formed integrally with said plug portion, an annular elastically deformable flange formed on the opposite end of said threaded plug portion, said flange having the inside and the outside thereof each defined by a frusto-conical wall tapering from the last mentioned end of said plug portion with the cone angle of said frusto-conical wall being about 30 to 130 degrees and the thickness of the material of said frusto-conical flange being substantially smaller than the thickness of the material of said plug portion, said flange being capable of having its frusto-conical outside wall abut against said seat and be partially inserted in said opening in the closed position of said closing member so as to be forced somewhat inwardly and upwardly by the closing pressure of said closing member when the plug portion is threaded into said neck.

References Cited in the file of this patent

UNITED STATES PATENTS

| | | |
|---|---|---|
| 2,038,858 | Sacks | Apr. 28, 1936 |
| 2,813,650 | Takahashi et al. | Nov. 19, 1957 |

FOREIGN PATENTS

| | | |
|---|---|---|
| 58,377 | France | June 24, 1953 |
| 1,060,557 | France | Nov. 18, 1953 |
| 477,152 | Italy | Jan. 13, 1953 |
| 757,792 | Great Britain | Sept. 26, 1956 |